(12) United States Patent
Yen et al.

(10) Patent No.: US 9,547,468 B2
(45) Date of Patent: Jan. 17, 2017

(54) CLIENT-SIDE PERSONAL VOICE WEB NAVIGATION

(71) Applicant: MICROSOFT TECHNOLOGY LICENSING, LLC, Redmond, WA (US)

(72) Inventors: Cheng-Yi Yen, Redmond, WA (US); Derek Liddell, Kent, WA (US); Kenneth Reneris, Clyde Hill, WA (US); Charles Morris, Seattle, WA (US); Dieter Rindle, Klosterlechfeld (DE); Tanvi Surti, Seattle, WA (US); Michael Stephens, Seattle, WA (US); Eka Tjung, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 137 days.

(21) Appl. No.: 14/231,570

(22) Filed: Mar. 31, 2014

(65) Prior Publication Data
US 2015/0277846 A1 Oct. 1, 2015

(51) Int. Cl.
*G06F 3/16* (2006.01)
*G06F 3/041* (2006.01)
(Continued)

(52) U.S. Cl.
CPC ................ *G06F 3/16* (2013.01); *G06F 3/041* (2013.01); *G06F 3/04817* (2013.01);
(Continued)

(58) Field of Classification Search
CPC ........ G06F 3/16; G06F 3/041; G06F 3/04817; G06F 3/04842; G06F 17/30899; G10L 15/265
See application file for complete search history.

(56) References Cited

U.S. PATENT DOCUMENTS

| 5,893,063 A * | 4/1999 | Loats ...................... G10L 15/26 704/270 |
| 7,653,544 B2 * | 1/2010 | Bradley ................. G06Q 50/01 704/260 |

(Continued)

OTHER PUBLICATIONS

Viticci, Federico , "Coming Soon: i Phone Voice Control for Everything—MacStories", Published on: Jan. 30, 2011, Available at: http://www.macstories.net/iphone/coming-soon-iphone-voice-control-for-everything/ (4 pages total).*

(Continued)

*Primary Examiner* — Maryam Ipakchi
(74) *Attorney, Agent, or Firm* — Miia Sula; Judy Yee; Micky Minhas (57) ABSTRACT

A system running on a mobile device such as a smartphone is configured to expose a user interface (UI) to enable a user to specify web pages that can be pinned to a start screen of the device. Once pinned, the user may launch a web page by voice command from any location on the UI or from within any experience that is currently being supported on the device. Thus, the user can be on a call with a friend talking about a new video game and then use a voice command to launch a web browser application on the mobile device that navigates to a pinned web page having information about the game's release date. Web pages can be readily pinned and unpinned from the start screen through the UI. When a web page is unpinned from the start screen, the system disables voice web navigation for it.

15 Claims, 11 Drawing Sheets

(51) Int. Cl.
*G06F 3/0481* (2013.01)
*G06F 3/0484* (2013.01)
*G10L 15/26* (2006.01)
*G06F 17/30* (2006.01)

(52) U.S. Cl.
CPC .... *G06F 3/04842* (2013.01); *G06F 17/30899* (2013.01); *G10L 15/265* (2013.01)

(56) References Cited

U.S. PATENT DOCUMENTS

| | | | | |
|---|---|---|---|---|
| 8,423,911 | B2* | 4/2013 | Chaudhri | G06F 3/04817 715/765 |
| 9,015,584 | B2* | 4/2015 | Park | G06F 3/0488 715/702 |
| 2004/0054539 | A1* | 3/2004 | Simpson | G10L 15/30 704/270.1 |
| 2005/0143975 | A1* | 6/2005 | Charney | G10L 15/26 704/201 |
| 2007/0033054 | A1* | 2/2007 | Snitkovskiy | G06F 3/167 704/275 |
| 2009/0106704 | A1* | 4/2009 | De Leon | G06F 3/0238 715/847 |
| 2009/0178006 | A1* | 7/2009 | Lemay | G06F 3/04817 715/835 |
| 2010/0105364 | A1* | 4/2010 | Yang | G06F 17/30663 455/414.1 |
| 2011/0138287 | A1* | 6/2011 | Katsuranis | G06F 3/011 715/728 |
| 2011/0307794 | A1 | 12/2011 | Hilerio et al. | |
| 2011/0307883 | A1* | 12/2011 | Hilerio | G06F 3/0481 717/176 |
| 2012/0016678 | A1* | 1/2012 | Gruber | G06F 17/3087 704/275 |
| 2012/0089392 | A1* | 4/2012 | Larco | G10L 15/063 704/231 |
| 2012/0150546 | A1* | 6/2012 | Cheng | G06F 3/167 704/275 |
| 2012/0209608 | A1* | 8/2012 | Lee | G10L 15/22 704/246 |
| 2013/0031486 | A1 | 1/2013 | Schultz et al. | |
| 2013/0219277 | A1* | 8/2013 | Wang | G06F 3/167 715/728 |
| 2013/0325484 | A1* | 12/2013 | Chakladar | G06F 3/167 704/275 |
| 2013/0347094 | A1* | 12/2013 | Bettini | H04L 63/0227 726/11 |
| 2014/0040746 | A1* | 2/2014 | Reich | G06F 3/167 715/728 |
| 2014/0040748 | A1* | 2/2014 | Lemay | G06F 3/167 715/728 |
| 2014/0173521 | A1* | 6/2014 | Mayor | H04M 1/72519 715/835 |
| 2014/0222436 | A1* | 8/2014 | Binder | G06F 3/167 704/275 |
| 2014/0274211 | A1* | 9/2014 | Sejnoha | H04M 1/72519 455/563 |
| 2014/0278419 | A1* | 9/2014 | Bishop | G06F 3/16 704/249 |
| 2014/0343950 | A1* | 11/2014 | Simpson | G06F 3/167 704/275 |

OTHER PUBLICATIONS

EightForums, "Start Screen—Pin or Unpin App, Folder, or Drive in Windows 8", Published Sep. 15, 2011, Available at http://www.eightforums.com/tutorials/2352-start-screen-pin-unpin-app-folder-drive-windows-8-a.html (10 pages total).*

Staff, Appleinsider, "Websites Activating Safari Push Notifications Ahead of OS X Mavericks Rollout", Published on: Oct. 21, 2013, Retrieved from : http://appleinsider.com/articles/13/10/22/websites-activating-safari-push-notifications-ahead-of-os-x-mavericks-rollout Retrieved Date: May 1, 2014 (2 pages total).

"International Search Report and Written Opinion Issued in PCT Patent Application No. PCT/US2015/022603", Mailed Date: Jun. 9, 2015, (8 Pages total) (MS# 341424.02).

Benton, Joshua, "Now Websites can send Push Notifications—Not Just Apps", Published on: Jun. 2013, Avaiable at: http://www.niemanlab.org/2013/06/now-websites-can-send-push-notifications-not-just-apps/ (5 pages total).

Dilger, Daniel Eran, "Safari 7.0 to Bring Web Notifications to OS X Mavericks", Published on Jun. 28, 2013, Available at: http://appleinsider.com/articles/13/06/28/safari-70-to-bring-web-notifications-to-os-x-mavericks (5 pages total).

Armstrong, et al., "Efficient and Transparent Dynamic Content Updates for Mobile Clients", In Proceedings of the 4th International Conference on Mobile Systems, Applications and Services, Jun. 19, 2006, (13 pages total).

Tyrsina, Radu, "Firefox Web Browser will Get a Push Notification System", Published on: Feb. 7, 2012, Available at: http://thetechjournal.com/internet/firefox-web-browser-will-get-a-push-notification-system.xhtml (4 pages total).

Lalmalani, Rahul, "Pinned Sites in Windows 8: Getting more visibility of your site", Published on: Jan. 21, 2013, Available at: http://www.codeproject.com/Articles/530445/Pinned-Sites-in-Windows-8-Getting-more-visibility (5 pages total).

"Internet Explorer on Windows 8.1: One browser, two Experiences", Published on: Nov. 13, 2013, Available at: http://msdn.microsoft.com/en-us/library/ie/hh771832(v= vs.85).aspx (8 pages total).

"Second Written Opinion Issued in PCT Application No. PCT/US2015/022603", Mailed Date: Feb. 26, 2016, (6 Pages total) (MS# 341424.02).

Agar, Colt, "How to Pin Your Favorite Websites to Your iPhone's Home Screen", Retrieved from <<http://thetechreviewer.com/tech-tips/pin-favorite-websites-iphones-home-screen/?singlepage=1>>, May 24, 2013, (8 Pages total).

"International Preliminary Report on Patentability Issued in PCT Application No. PCT/US2015/022603", Mailed Date: Jun. 2, 2016, 7 Pages. (MS# 341424.02).

* cited by examiner

CLIENT-SIDE PERSONAL VOICE WEB NAVIGATION

BACKGROUND

Mobile devices are leveraging new communication services on advanced mobile operator (MO) networks that provide voice and data services to support rich user experiences such as website browsing over the Internet. While such devices and networks perform satisfactorily in many applications, further improvements are desired to enable additional features and experiences for mobile device users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A system running on a mobile device such as a smartphone is configured to expose a user interface (UI) to enable a user to specify web pages that can be pinned to a start screen of the device. Once pinned, the user may launch a web page by voice command from any location on the UI or from within any experience that is currently being supported on the device. Thus, for example, the user can be on a call with a friend talking about a new video game and then use a voice command to launch a web browser application on the mobile device that navigates to a pinned web page having information about the game's release date. Web pages can be readily pinned and unpinned from the start screen through the UI. When a web page is unpinned from the start screen, the system disables voice web navigation for it.

In various illustrative examples, the mobile device is equipped with a touchscreen so that when viewing a web page on the browser, the user can invoke an application menu that exposes a control which the user can tap to pin the web page to the start screen. The system will assign a name to a token to represent that web page and place it on the start screen to indicate to the user that it is capable of being launched by voice command using the assigned name. The system incorporates a virtual personal assistant that exposes a natural language interface that is responsive to voice commands. So, for example, when the user says "open live Xbox" the system will trigger the web browser application to navigate to the live.xbox.com web page. The system exposes another control that enables the user to tap and hold the web page token on the start screen to unpin it.

Advantageously, the system provides a quick, simple, and consistent way for the user to select and launch web pages from within any experience with just two steps—launching the virtual personal assistant and then speaking the command to navigate to the selected web page by name. These two steps can always be used independent of the number of web pages that the user has pinned to the start screen. In addition, unlike some conventional solutions, the present system for voice web navigation does not perform a web search using an external server to navigate to web pages by name. By eliminating such intermediate search step, mobile device resources, including power and network bandwidth utilization, are preserved while enhancing the overall user experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
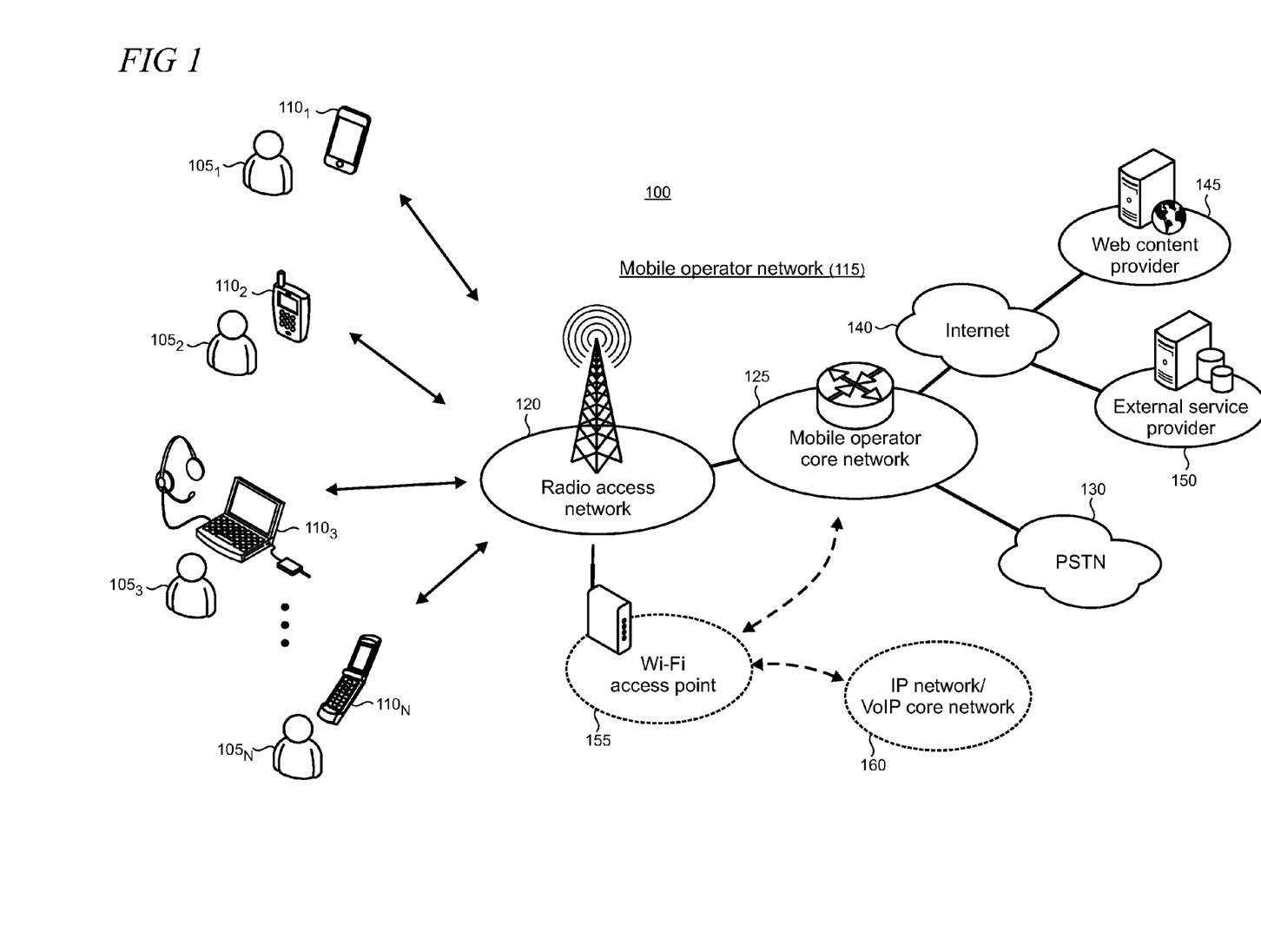
FIG. 1 shows an illustrative telecommunications environment in which devices having telephony capabilities communicate over a mobile operator network.

FIG. 1 shows an illustrative telecommunications environment 100 in which various users 105 employ respective devices 110 that communicate over a mobile operator (MO) network 115. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, and smartphones which users often employ to make and receive voice and/or multimedia calls, send and receive text/video messages and emails, and utilize data-based services to implement a variety of user experiences.

However, alternative types of electronic devices are also envisioned to be usable within the telecommunications environment 100 so long as they are configured with communication capabilities and can connect to the MO network 115. Such alternative devices variously include handheld computing devices, PDAs (Personal Digital Assistants), portable media players, wearable computing devices, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with communication capabilities and are capable of wireless connectivity to the MO network 115.

Each mobile device 110 will typically have a prearranged association with the MO network 115. For example, a user 105 will typically be a subscriber to a cellular service plan so that the user's mobile device 110 can access the MO network as valid and authenticated user equipment typically for voice and data services. The MO network 115 in this illustrative example includes a radio access network 120 having a number of macrocells that support access by the devices 110 to an MO core network 125. The backend of the MO network 115 typically includes interfaces that support a connection to network infrastructure including a public switched telephone network (PSTN) 130. A connection to the Internet 140 is also typically supported so that the mobile devices 110 can access content provided by one or more web content providers 145. An external service provider 150, described in more detail below, may also be accessible over the MO network 115.

In alternative implementations, one or more of the mobile devices 110 may be configured to interact with a IEEE 802.11 compliant Wi-Fi access point 155 in order to access various services which can typically include voice and/or data services. The Wi-Fi access point may be operatively coupled to the MO core network 125 or other networks such as IP (Internet Protocol) networks, VoIP (Voice over Internet Protocol) networks, and/or other network types or combinations of networks, as representatively indicated by reference numeral 160.

Figure 2:
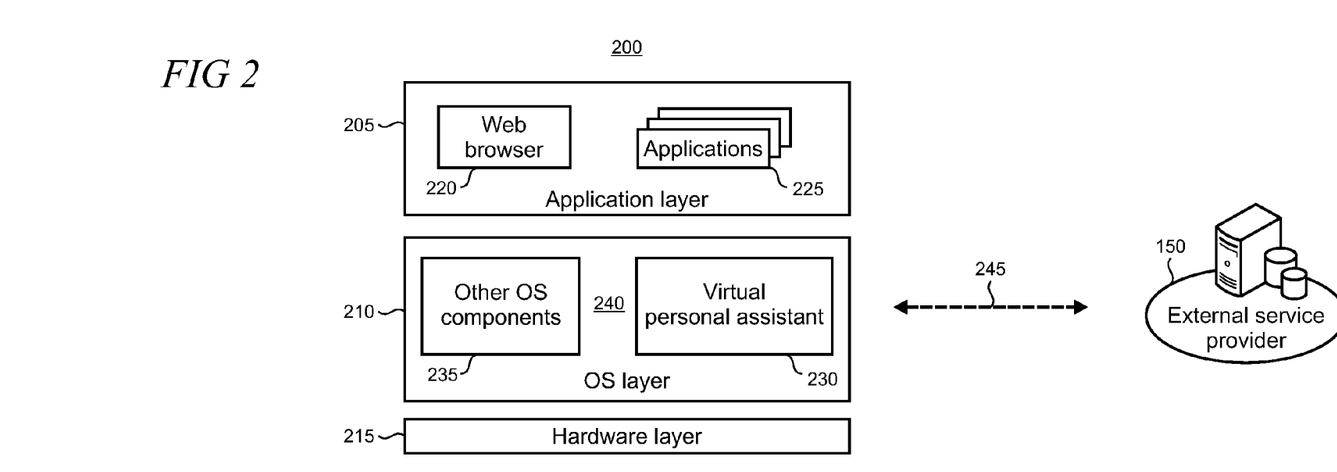
FIG. 2 shows an illustrative architecture supporting a hardware layer, operating system layer, and application layer.

FIG. 2 shows an illustrative architecture 200 of functional components that may be instantiated on a given mobile device 110 (FIG. 1). The architecture 200 is typically implemented in software, although combinations of software, firmware, and/or hardware may also be utilized in some cases. The architecture 200 is arranged in layers and includes an application layer 205, an OS (operating system) layer 210, and a hardware layer 215. The hardware layer 215 provides an abstraction of the various hardware used by a mobile device 110 (e.g., input and output devices, networking hardware, etc.) to the layers above it.

The application layer 205, in this example, supports a web browser application 220 configured for retrieving, presenting, and traversing information from web-based resources such as those exposed by provider 145 in FIG. 1. Other applications 225 that support various other user experiences are also supported in the application layer 205. The applications 225 are often implemented using locally executing code. However in some cases, the applications 225 may rely on services and/or remote code execution provided by remote servers or other computing platforms such as those supported by an external service provider 150.

The OS layer 210, in this example, supports a virtual personal assistant 230 and other OS components 235. The OS components 235, by themselves, or in combination with the virtual personal assistant 230 in some cases, implement a system 240 on the mobile device 110 that functions to provide the voice web navigation described herein. In addition, the system 240 can interoperate with components in the application and/or hardware layers, for example, to expose UIs including various user controls or implement other functionality that may be needed to support voice web navigation. The system 240 and virtual personal assistant 230 can also be supported, in whole or part, using code or methods that run in the application layer 205 and/or hardware layer 215 and/or using code or methods that execute remotely from the mobile device 110. For example, remote code or methods supporting the system 240 and virtual personal assistant 230 can execute on servers or other computing devices supported by the external service provider 150 (as indicated by the dashed line 245 in FIG. 2).

Figure 3:
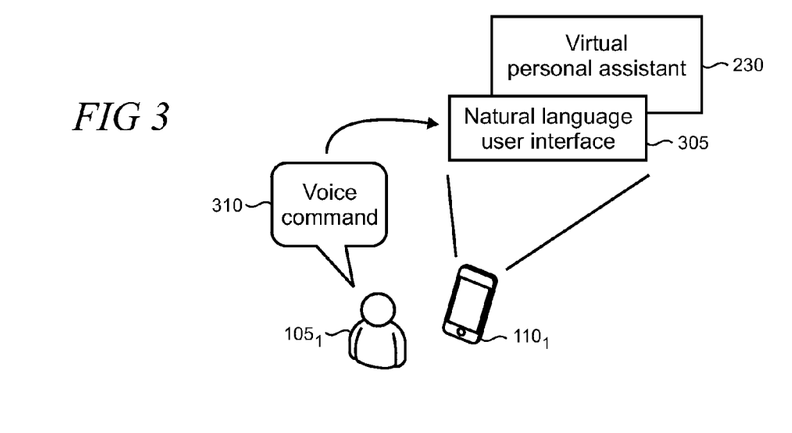
FIG. 3 shows an illustrative mobile device that includes a virtual personal assistant that exposes a natural language interface.

As shown in FIG. 3, the virtual personal assistant 230 employs a natural language UI 305 that can take voice commands 310 as inputs from the user 105. The voice commands 310 can be used to invoke various actions, features, and functions on the mobile device, provide inputs to the systems and applications, and the like. In some cases, the voice commands 310 can be utilized on their own in support of a particular user experience while in other cases the voice commands can be utilized in combination with other non-voice commands or inputs such as those implementing using physical controls on the mobile device or virtual controls implemented on a UI.

Figure 4:
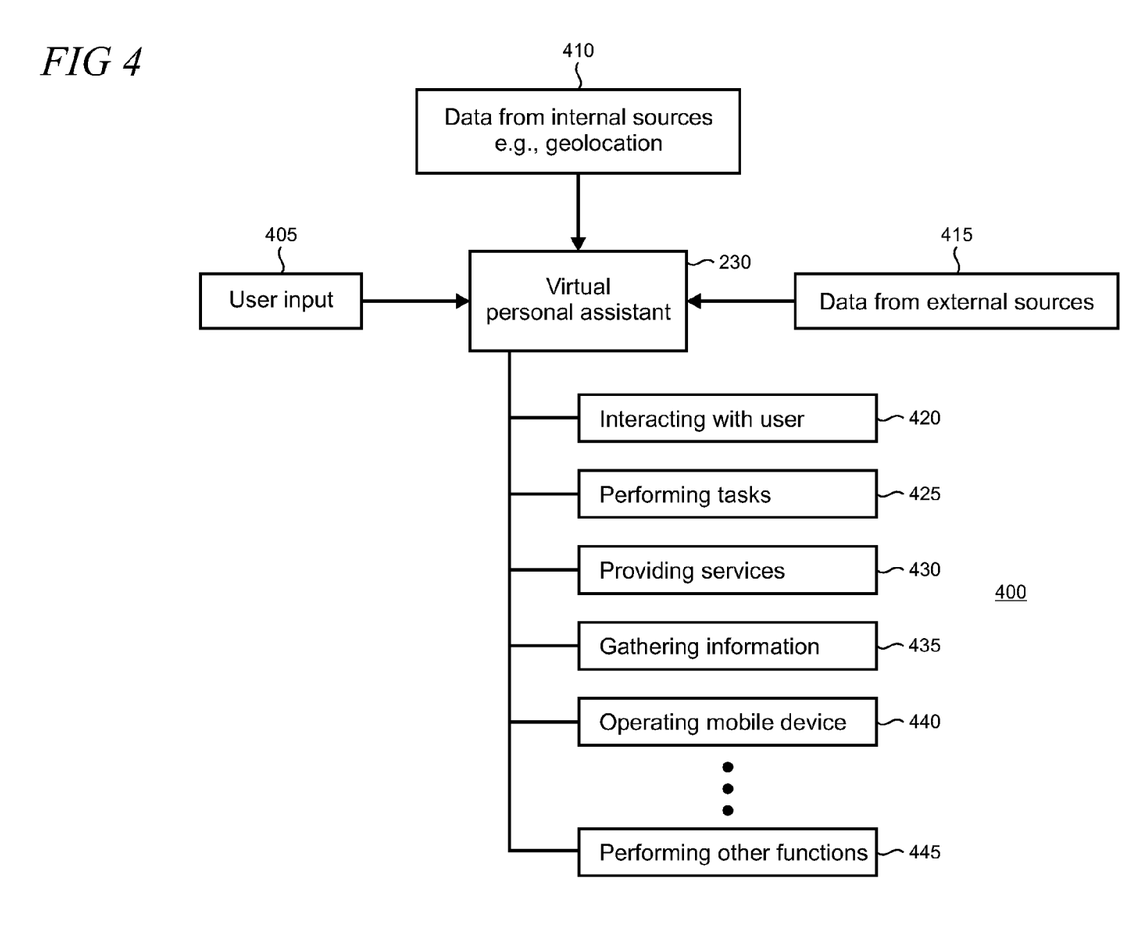
FIG. 4 shows an illustrative taxonomy of functions that are supported by a virtual personal assistant.

FIG. 4 shows an illustrative taxonomy of functions 400 that are supported by the virtual personal assistant 230. Inputs to the virtual personal assistant 230 typically can include user input 405, data from internal sources 410, and data from external sources 415. For example, data from internal sources 410 could include the current geolocation of the mobile device 110 that is reported by a GPS (Global Positioning System) component on the device, or some other location-aware component. The externally sourced data 415 includes data provided, for example, by external systems, databases, services, and the like such as the external service provider 150 (FIG. 1).

As shown, the functions 400 include interacting with the user 420 (through the natural language UI and other graphical UIs, for example); performing tasks 425 (e.g., making note of appointments in the user's calendar, sending text messages and emails, etc.); providing services 430 (e.g., answering questions from the user, mapping directions to a destination, etc.); gathering information 435 (e.g., finding information requested by the user about a book or movie, locating the nearest Italian restaurant, etc.); operating the mobile device 440 (e.g., setting preferences, adjusting screen brightness, turning wireless connections such as Wi-Fi and Bluetooth on and off, etc.); and performing various other functions 445. The list of functions 400 is not intended to be exhaustive and other functions may be provided by the virtual personal assistant as may be needed for a particular implementation of voice web navigation.

Figure 5:
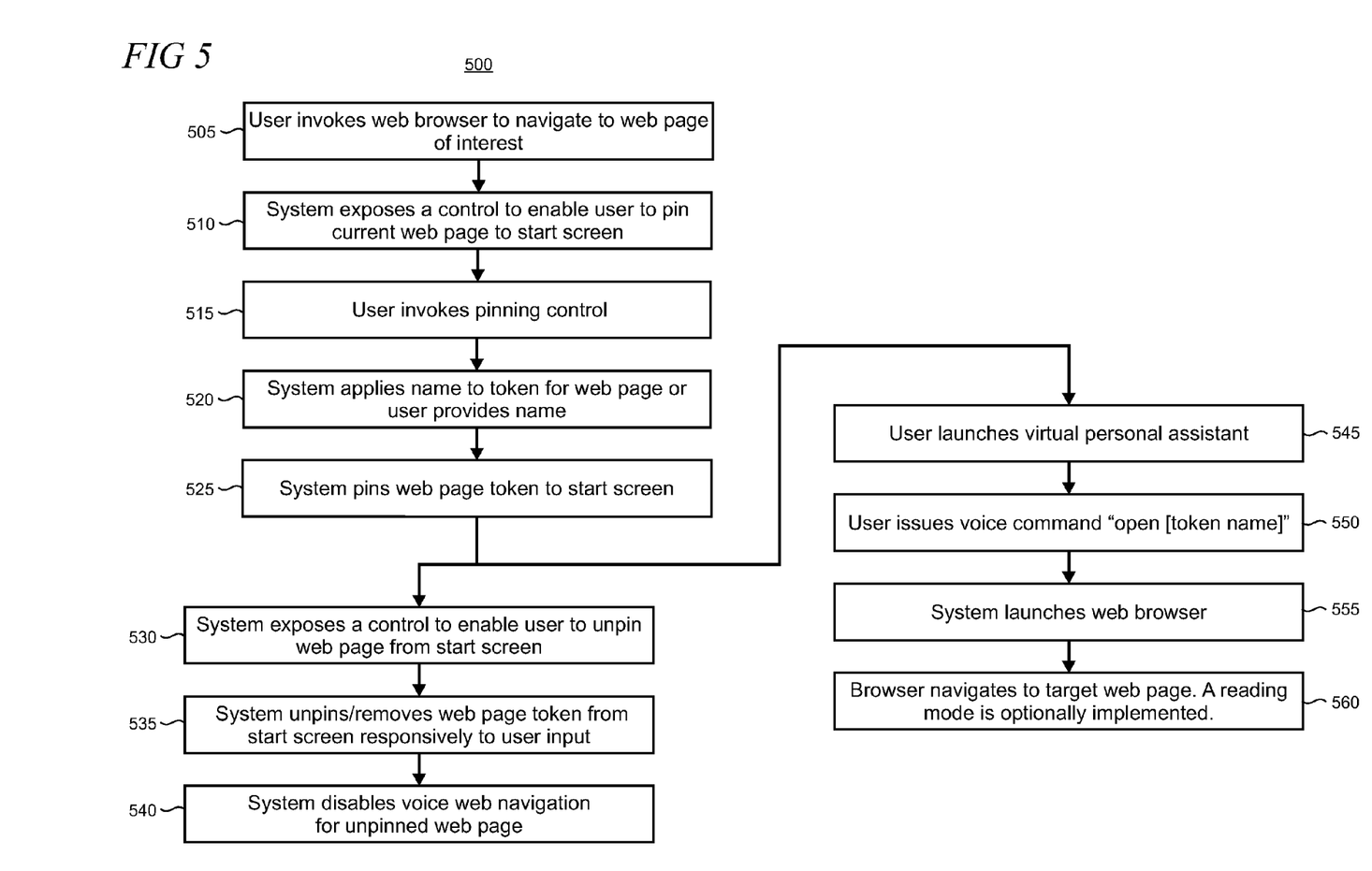
FIG. 5 is a flowchart of an illustrative method by which a user may navigate to a pinned web page using voice commands.

FIG. 5 is a flowchart of an illustrative method 500 by which a user 105 (FIG. 1) may navigate to a pinned web page using voice commands. Steps 505-540 describe how a user 105 (FIG. 1) can pin and unpin a web page to the start screen. Steps 545-560 describe the user 105 interacting with the virtual personal assistant 230 (FIG. 2) to navigate to a pinned web page using voice commands. Unless specifically stated, the methods or steps shown in the flowchart in FIG. 5 and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Figure 6:
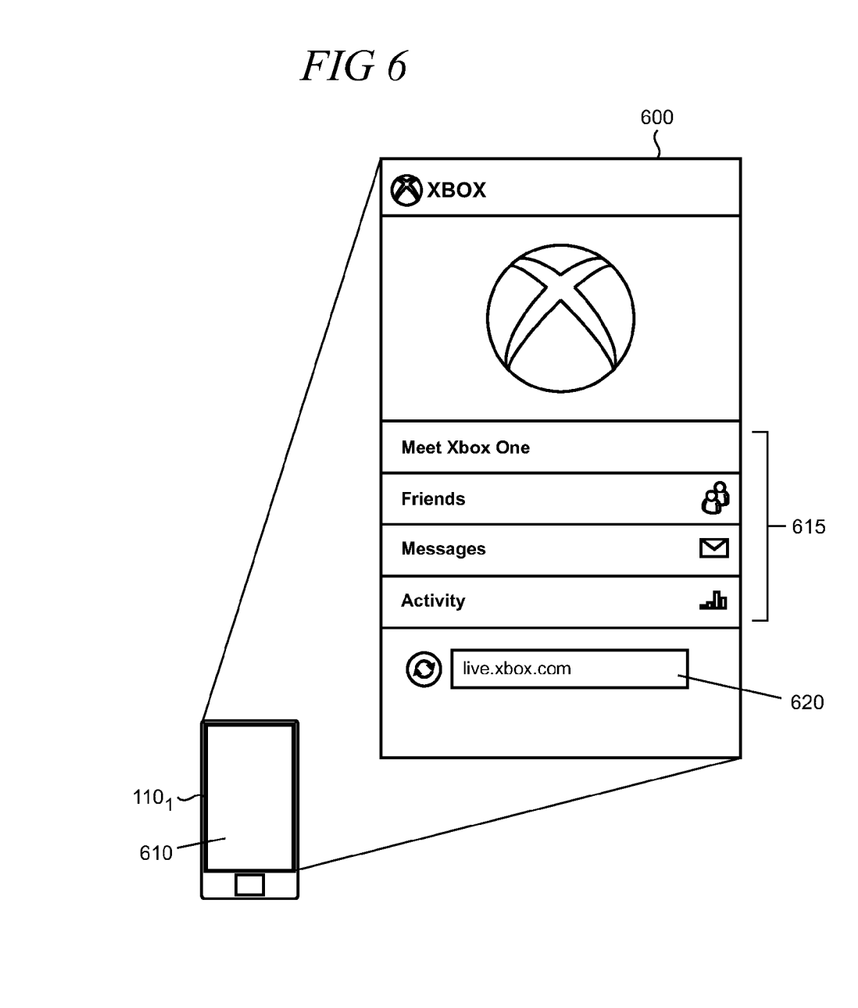
FIGS. 6-15 depict illustrative screen captures of various user interfaces that are exposed on a mobile device.
Figure 7:
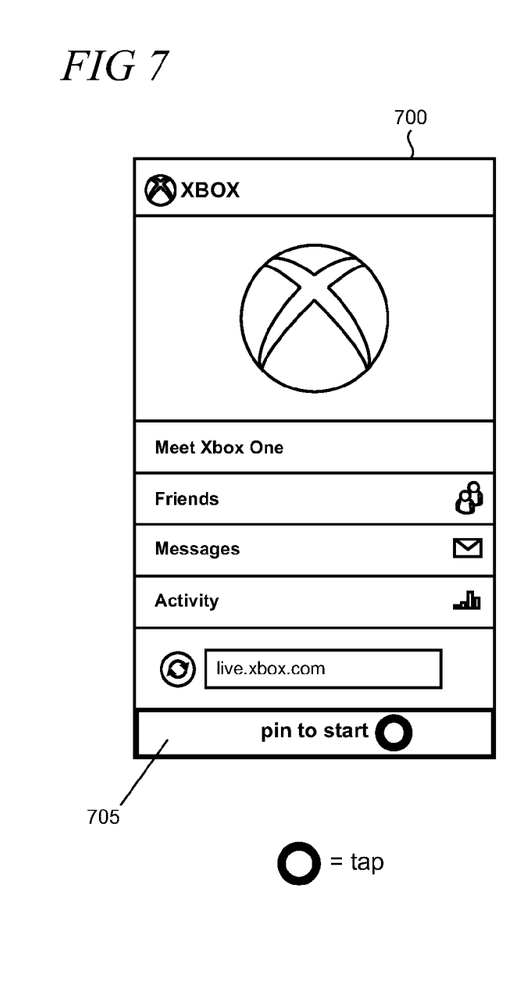

In step 505, the user 105 invokes the web browser 220 and navigates to some web page of interest. FIG. 6 shows a screen capture of an illustrative UI 600 that is shown by the web browser on the display 610 of a mobile device 110 when the user navigates to a web page having a URL (Uniform Resource Locator) of www.live.xbox.com. In this example, and for the screen captures that follow in FIGS. 7-15, the display 610 on the mobile device 110 is configured as a touchscreen. As shown in FIG. 6, the UI 600 exposes several user controls 615 (e.g., buttons) that the user can invoke to navigate to various user experiences that are supported by the website. An address bar 620 shows the web address for the current page.

Returning to the flowchart in FIG. 5, in step 510, the system 240 exposes a control that enables the user 105 to pin the currently displayed web page (i.e., as shown in FIG. 6) to a start screen that can be displayed by the mobile device 110. Typically, the user can surface the control by invoking an application menu or similar menu from within the browser. In this example, a button 705 is displayed at the bottom of the display as shown in the UI 700 in FIG. 7 and includes the text "pin to start." The user 105 taps the button 705 to pin the currently displayed web page to the start menu, as shown in step 515 in FIG. 5.

Figure 8:
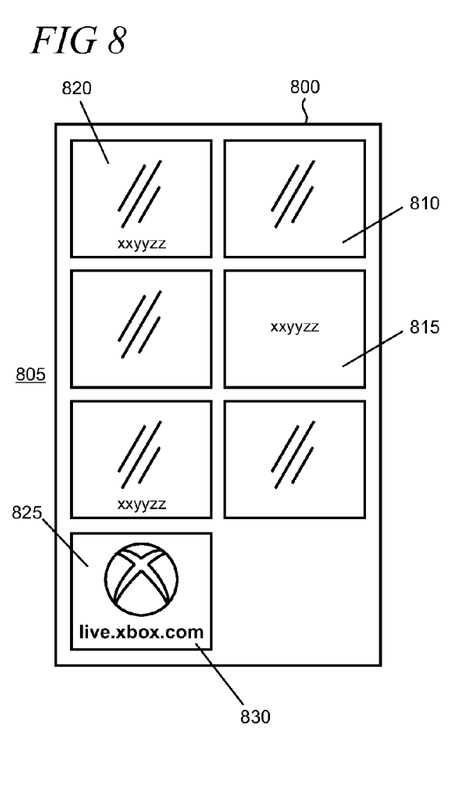
Figure 9:
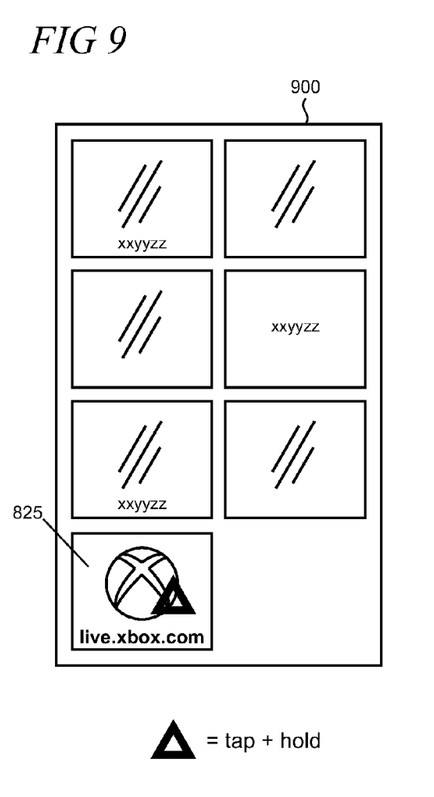
Figure 10:
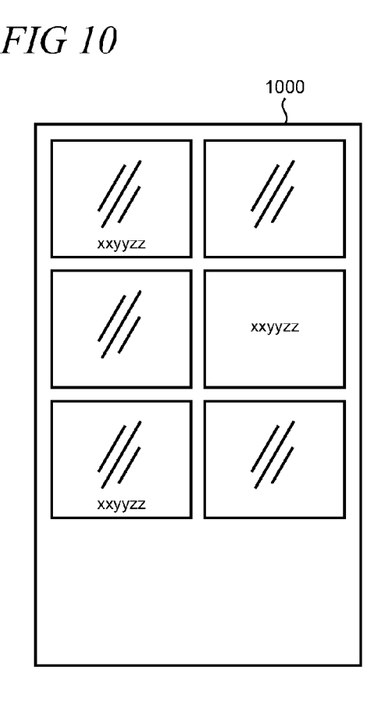

FIG. 8 depicts an illustrative UI 800 that shows a typical start screen 805. The start screen shown is intended to be illustrative and other layouts and configurations can be utilized to meet the needs of a particular implementation. The start screen 805 may be configured to be invoked, for example, by pressing a physical button on the mobile device, manipulating a virtual button, or issuing a voice command in some cases. The start screen 805 typically functions as a primary UI component on the mobile device 110 for displaying and launching installed applications, control panel settings, contacts, games, music albums, videos, maps, and links, among other items.

The items on the start screen are represented by tiles. In this example, there are seven tiles shown. Some of the tiles include graphics (e.g., symbols, icons, glyphs, pictures, logos, etc.) as representatively indicated by reference numeral 810. Other tiles on the start screen 805 include text as representatively indicated by reference numeral 815 and some tiles use both graphics and text as representatively indicated by reference numeral 820. The mix of tile types shown on a given start screen can be expected to vary by user and mobile device and the particular graphics/text used for any given tile is generally a matter of design choice made by the content provider or application developer.

The start screen 805 can be virtually larger than the physical size of the display on the mobile device in typical implementations and the user can scroll the start screen to reveal other tiles in such cases. The start screen 805 is configured to be customizable by the user 105 to reflect particular preferences in typical implementations. For example, the user can generally select the position of tiles relative to each other and in some cases pick tile size, color schemes, and the like.

The tile in the lower left of the UI 800 is a token 825 that represents the pinned web page. Pinned web pages can be launched by voice command so by pinning the web page to the start screen 805, the user is opting in to having this feature being enabled. There is typically no limit on the number of web pages that can be pinned to the start screen. When a web page is pinned, the system 240 can place the token on the start screen in any of a variety of different positions depending on the needs of a given implementation. For example, a newly pinned token can be placed on the first page of the start screen (i.e., the portion of the start screen that is displayed when the screen is first invoked) so that the user does not need to scroll to see the token. This technique allows the user to quickly verify that the web page has been pinned without the need for extra UI interaction. Alternatively, the system can place the token at an available empty space in the start screen, or place the token near the last tile that was added. In some cases, the user can express preferences for where and how pinned tokens are displayed on the start screen.

Returning to FIG. 5, in step 520, the system applies a name to the token 825 (FIG. 8) when pinning the token to the start screen in step 525. The name is indicated by reference numeral 830 in FIG. 8 which in this example is "live.xbox.com." The token name 830 may be utilized by the user 105 as part of the voice command to navigate to the associated web page. The system 240 will typically use a developer specified tag as the token name. So in this example, the developer of the website has specified the name "live.xbox.com." In cases where the developer does not specify a name for the token, the URL for the web page is parsed to find a unique name to be used for the token. The parsing can be performed, for example, by a process that executes on a server or other platform supported by the external service provider 150 (FIG. 1).

In some implementations, step 520 can include the system exposing a UI or other controls that enable the user 105 to provide a name for the token. In some cases, the UI can also provide the user with options to choose and/or change the graphic appearance of the token. In this way, the user can exercise control over how voice-based and visual experiences are supported by the system 240 on the mobile device 110 and personalize the experiences to meet the user's preferences.

In step 530, the system 240 exposes a control to enable the user 105 to unpin a web page from the start screen. In step 535, the system 240 unpins and removes the page's associated token from the start screen in response to the user's invocation of the control and disables voice web navigation for the unpinned web page in step 540. As shown in the UI 900 in FIG. 9, the control in this example comprises the user tapping and holding the token 825 until it disappears from the start screen as shown in the UI 1000 in FIG. 10.

Returning to FIG. 5, when the user wishes to employ voice web navigation to a pinned web page, the user launches the virtual personal assistant 230 (FIG. 2) in step 545. The virtual personal assistant is typically configured to be launched from any location within any UI on the device, or from within any current user experience. For example, the user 105 can be on a phone call, browsing the web, watching a video, or listening to music, and simultaneously launch the virtual personal assistant from within any of those experiences. In some cases the virtual personal assistant can be launched through manipulation of a physical or virtual user control, or by voice command in other cases.

Figure 11:
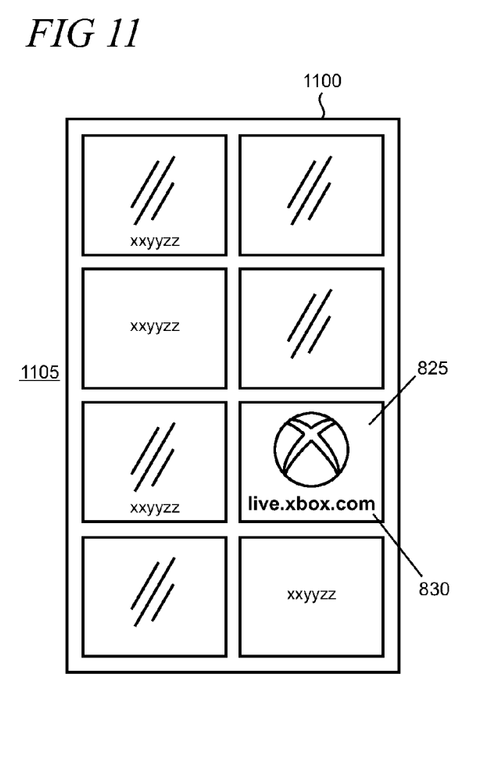
Figure 12:
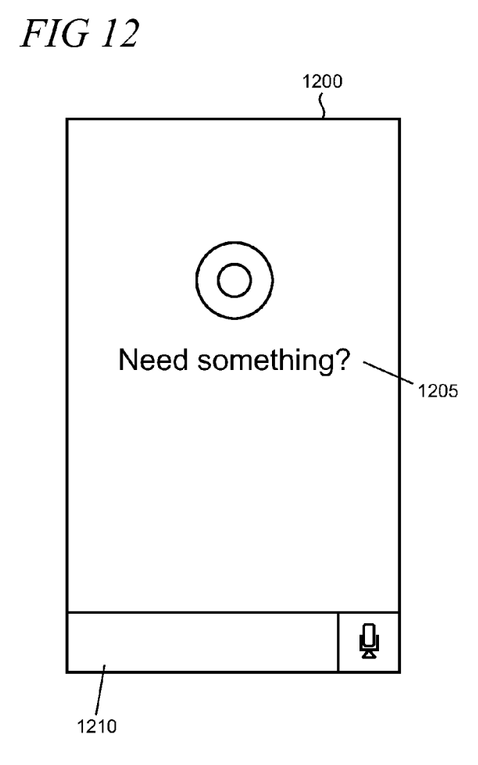
Figure 13:
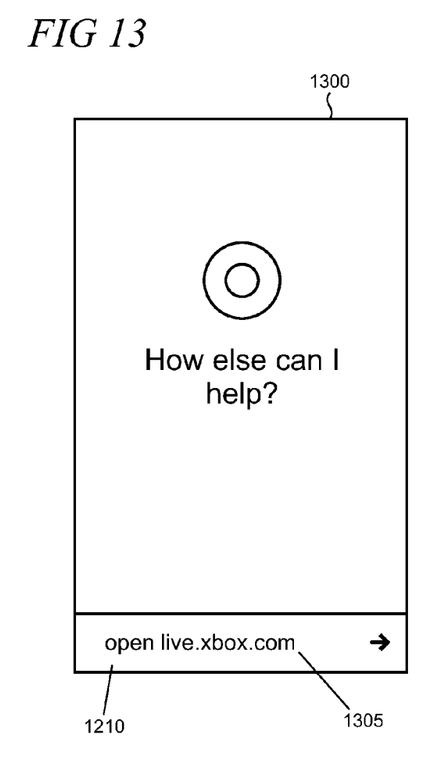

The virtual personal assistant 230 can also be launched from the start screen. An illustrative start screen 1105 is shown in the UI 1100 in FIG. 11 showing the web page token 825 and name 830. When the user launches the virtual personal assistant, a UI 1200 is shown on the mobile device 110 that includes a text string 1205 that asks the user if something is needed. In alternative implementations, text to voice translation can be employed so that an audio message can be played in place of, or to supplement the text string 1205. It is emphasized that the particular UI displayed for the virtual personal assistant can vary from what is shown according to the needs of a particular implementation. As shown, the UI includes a box 1210 that is configured for showing a textual representation of a received voice command.

Figure 14:
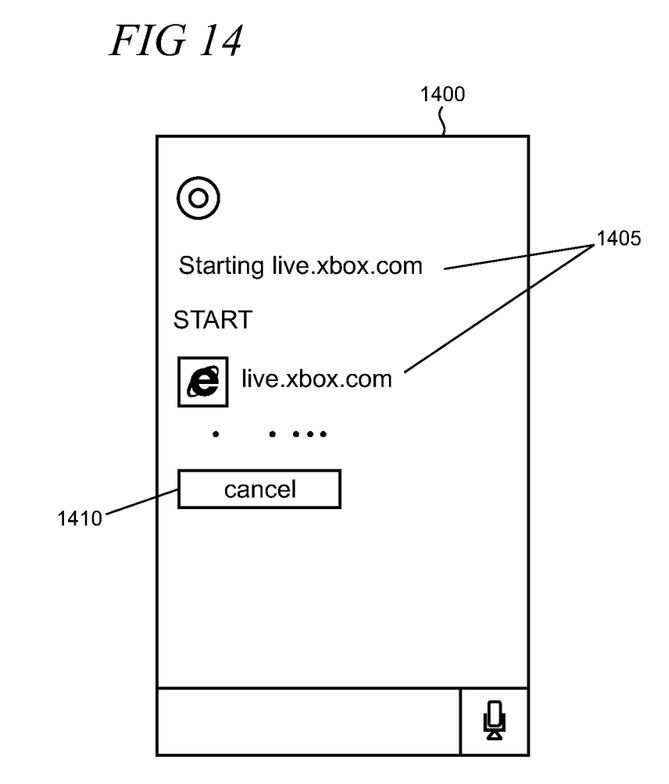
Figure 15:
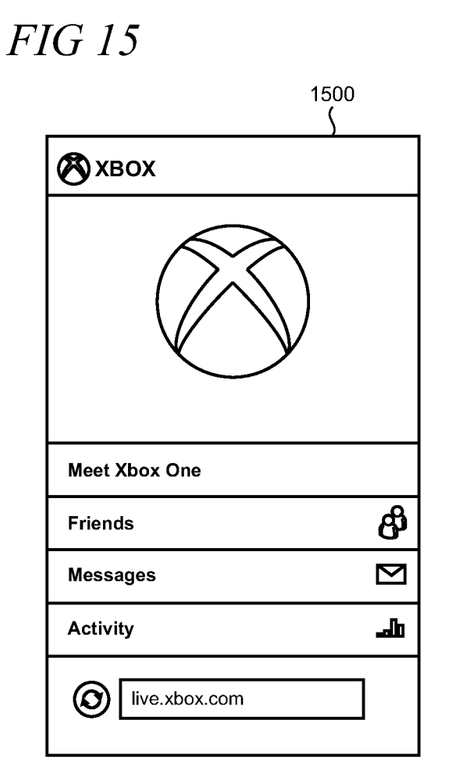

In step 550 in FIG. 5, the user issues a voice command using the syntax "open [token name]" which in this example is "open live xbox." The system 240 can be configured to recognize and disambiguate among variations in syntax in some cases. For example, in some implementations, the command "open live dot xbox dot com" will achieve the same result as "open xbox" and "open xbox live." The voice command is received by the system and displayed in the text box 1210 as a text string 1305 as shown in the UI 1300 in FIG. 13. As shown in FIG. 14, a transitional UI 1400 is shown by the virtual personal assistant on the mobile device display as the voice command is processed. The UI 1400 shows the URL of the web page to which navigation is executed (as indicated by reference numeral 1405) and a cancel button 1410 that the user can manipulate using the touchscreen or through another voice command to stop navigation to the pinned web page.

In step 555 in FIG. 5, in response to the voice command, the system 240 launches the web browser 220 (FIG. 2) which then navigates to the target web page associated with the pinned token 825 (FIG. 8) selected by the user in step 560. The target web page, live.xbox.com, is shown in UI 1500 in FIG. 15.

Step 560 may include providing an optionally utilized reading mode. Here, the web browser 220 is configured to support a text to speech functionality so that various portions of textual content on a target web page are converted to speech that is played over an audio endpoint (e.g., and internal speaker, external earpiece or headset, etc.) which is coupled to the mobile device. In some implementations, the web browser may interact with external service providers in order to implement some or all of the functionalities needed to support the reading mode. The reading mode can be expected to be advantageous in many applications as it provides users with a way to interact with the mobile device 110 and consume content without having to read it.

Figure 16:
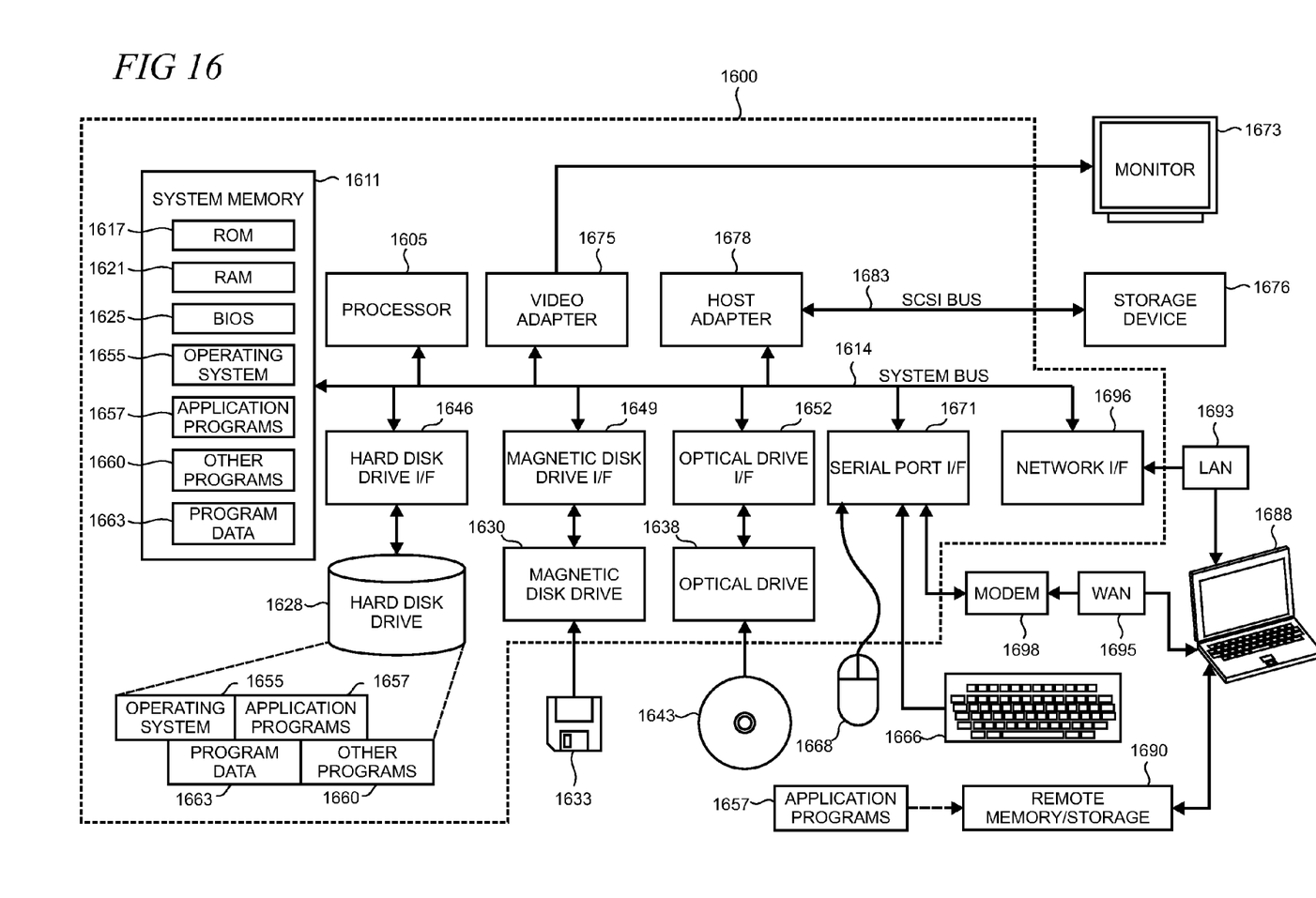
FIG. 16 is a simplified block diagram of an illustrative computer system such as a personal computer (PC) that may be used in part to implement the present voice web navigation.

FIG. 16 is a simplified block diagram of an illustrative computer system 1600 such as a personal computer (PC), client machine, or server with which the present voice web navigation may be implemented in some applications. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600.

Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present voice web navigation. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 1628, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present voice web navigation.

Figure 17:
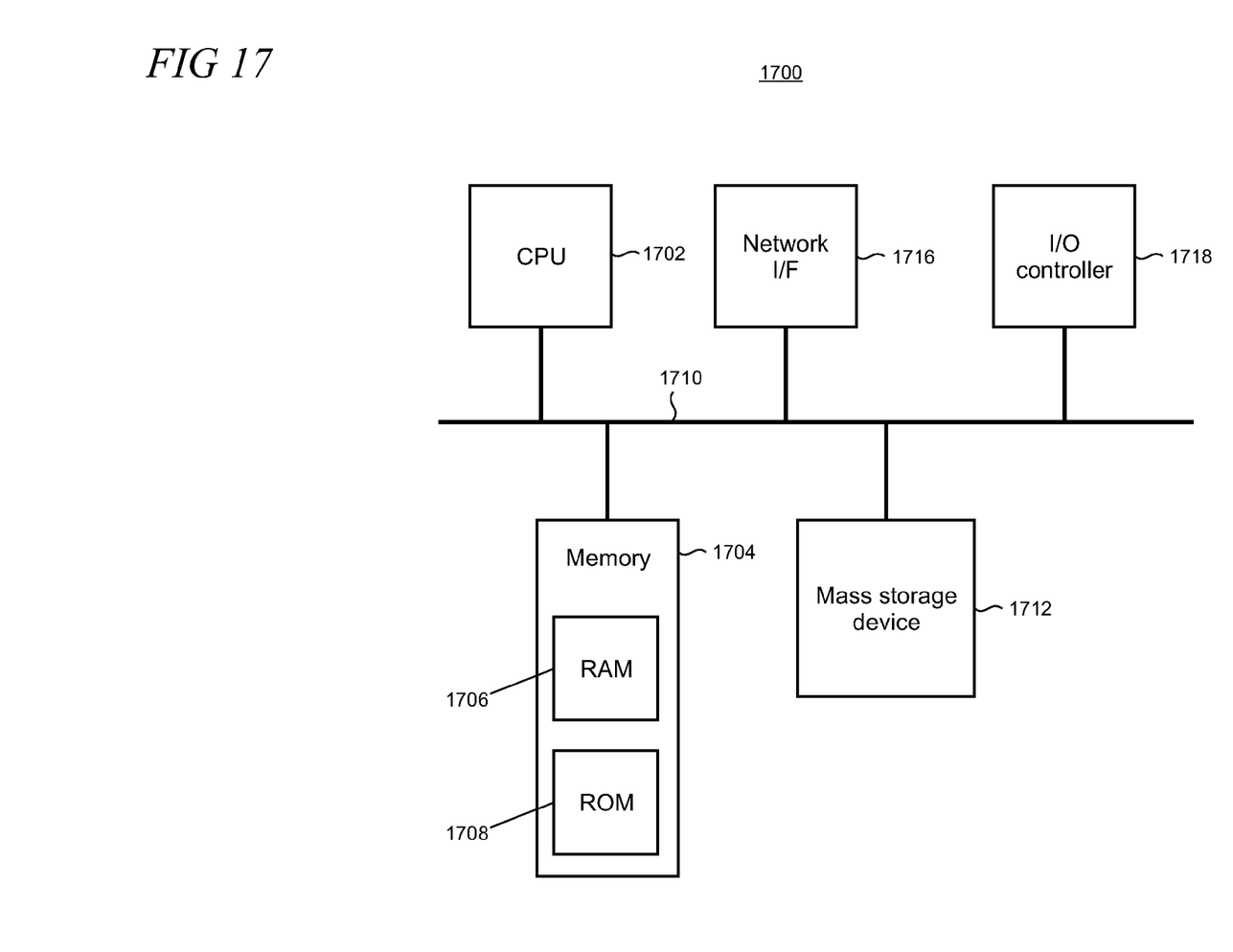
FIG. 17 shows a block diagram of an illustrative device that may be used in part to implement the present voice web navigation.

FIG. 17 shows an illustrative architecture 1700 for a device capable of executing the various components described herein for providing the present voice web navigation. Thus, the architecture 1700 illustrated in FIG. 17 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1700 may be utilized to execute any aspect of the components presented herein.

The architecture 1700 illustrated in FIG. 17 includes a CPU 1702, a system memory 1704, including a RAM 1706 and a ROM 1708, and a system bus 1710 that couples the memory 1704 to the CPU 1702. A basic input/output system containing the basic routines that help to transfer information between elements within the architecture 1700, such as during startup, is stored in the ROM 1708. The architecture 1700 further includes a mass storage device 1712 for storing software code or other computer-executed code that is utilized to implement applications, the file system, and the operating system.

The mass storage device 1712 is connected to the CPU 1702 through a mass storage controller (not shown) connected to the bus 1710. The mass storage device 1712 and its associated computer-readable storage media provide non-volatile storage for the architecture 1700.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It should be appreciated that the network interface unit 1716 also may be utilized to connect to other types of networks and remote computer systems. The architecture 1700 also may include an input/output controller 1718 for receiving and processing input from a number of other devices, including a keyboard, mouse, or electronic stylus (not shown in FIG. 17). Similarly, the input/output controller 1718 may provide output to a display screen, a printer, or other type of output device (also not shown in FIG. 17).

It should be appreciated that the software components described herein may, when loaded into the CPU 1702 and executed, transform the CPU 1702 and the overall architecture 1700 from a general-purpose computing system into a special-purpose computing system customized to facilitate the functionality presented herein. The CPU 1702 may be constructed from any number of transistors or other discrete circuit elements, which may individually or collectively assume any number of states. More specifically, the CPU 1702 may operate as a finite-state machine, in response to executable instructions contained within the software modules disclosed herein. These computer-executable instructions may transform the CPU 1702 by specifying how the CPU 1702 transitions between states, thereby transforming the transistors or other discrete hardware elements constituting the CPU 1702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1700 in order to store and execute the software components presented herein. It also should be appreciated that the architecture 1700 may include other types of computing devices, including handheld computers, embedded computer systems, smartphones, PDAs, and other types of computing devices known to those skilled in the art. It is also contemplated that the architecture 1700 may not include all of the components shown in FIG. 17, may include other components that are not explicitly shown in FIG. 17, or may utilize an architecture completely different from that shown in FIG. 17.

Figure 18:
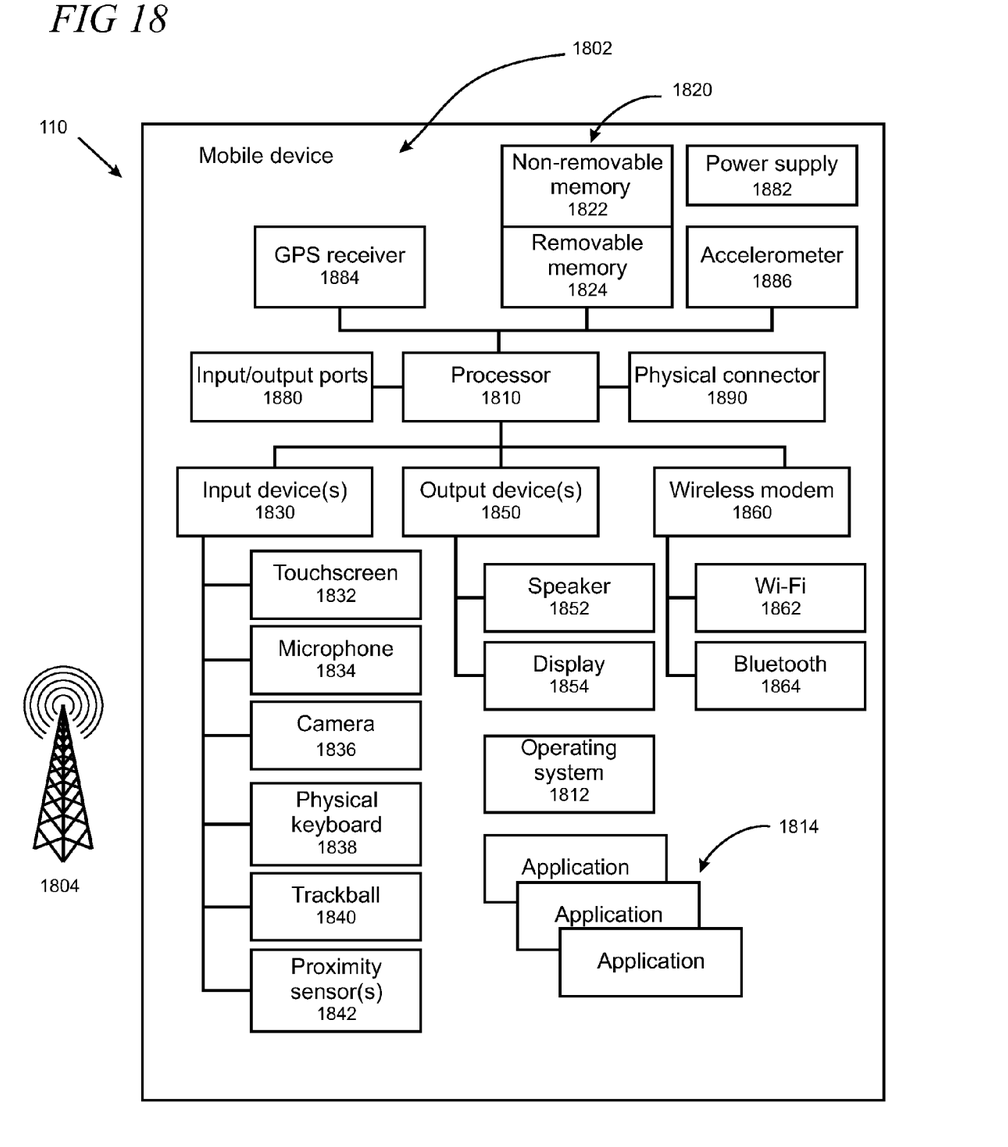
FIG. 18 is a block diagram of an illustrative mobile device.

FIG. 18 is a functional block diagram of an illustrative mobile device 110 such as a mobile phone or smartphone including a variety of optional hardware and software components, shown generally at 1802. Any component 1802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1804, such as a cellular or satellite network.

The illustrated mobile device 110 can include a controller or processor 1810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1812 can control the allocation and usage of the components 1802, including power states, above-lock states, and below-lock states, and provides support for one or more application programs 1814. The application programs can include common mobile computing applications (e.g., image-capture applications, email applications, calendars, contact managers, web browsers, messaging applications), or any other computing application.

The illustrated mobile device 110 can include memory 1820. Memory 1820 can include non-removable memory 1822 and/or removable memory 1824. The non-removable memory 1822 can include RAM, ROM, Flash memory, a hard disk, or other well-known memory storage technologies. The removable memory 1824 can include Flash memory or a Subscriber Identity Module (SIM) card, which is well known in GSM (Global System for Mobile communications) systems, or other well-known memory storage technologies, such as "smart cards." The memory 1820 can be used for storing data and/or code for running the operating system 1812 and the application programs 1814. Example data can include web pages, text, images, sound files, video data, or other data sets to be sent to and/or received from one or more network servers or other devices via one or more wired or wireless networks.

The memory 1820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1830; such as a touch screen 1832; microphone 1834 for implementation of voice input for voice recognition, voice commands and the like; camera 1836; physical keyboard 1838; trackball 1840; and/or proximity sensor 1842; and one or more output devices 1850, such as a speaker 1852 and one or more displays 1854. Other input devices (not shown) using gesture recognition may also be utilized in some cases. Other possible output devices (not shown) can include piezoelectric or haptic output devices. Some devices can serve more than one input/output function. For example, touchscreen 1832 and display 1854 can be combined into a single input/output device.

A wireless modem 1860 can be coupled to an antenna (not shown) and can support two-way communications between the processor 1810 and external devices, as is well understood in the art. The modem 1860 is shown generically and can include a cellular modem for communicating with the mobile communication network 1804 and/or other radio-based modems (e.g., Bluetooth 1864 or Wi-Fi 1862). The wireless modem 1860 is typically configured for communication with one or more cellular networks, such as a GSM network for data and voice communications within a single cellular network, between cellular networks, or between the mobile device and a public switched telephone network (PSTN).

The mobile device can further include at least one input/output port 1880, a power supply 1882, a satellite navigation system receiver 1884, such as a Global Positioning System (GPS) receiver, an accelerometer 1886, a gyroscope (not shown), and/or a physical connector 1890, which can be a USB port, IEEE 1394 (FireWire) port, and/or an RS-232 port. The illustrated components 1802 are not required or all-inclusive, as any component can be deleted and other components can be added.

Based on the foregoing, it should be appreciated that technologies for voice web navigation have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a mobile device with a user interface (UI) and a web browser application, the mobile device having access to a network including one of a wireless local area network or mobile operator network, comprising:
   receiving an input from a user to navigate to a web page on a web browser;
   exposing a control for enabling the user to pin the web page to a start screen that is supported on the UI;
   pinning the selected web page to the start screen responsively to user manipulation of the control;
   displaying a token on the start screen to represent the pinned web page, the displayed token including a text-based name;
   enabling the user to opt-in for voice web navigation only for web pages that are pinned to the start screen; and
   processing a voice command from the user to navigate to the pinned web page on the web browser using voice web navigation, the voice command using a syntax that includes the text-based name of the token displayed on the start screen.

2. The method of claim 1 further including configuring the mobile device so that the UI is supported on a touchscreen.

3. The method of claim 1 further including exposing a second control for enabling the user to unpin the pinned web page from the start screen.

4. The method of claim 3 further including disabling voice web navigation for the pinned web page when the pinned web page is unpinned from the start screen.

5. The method of claim 1 further including using a name for the displayed token that is provided by an application developer associated with the pinned web page or using a name for the displayed token that is selected by the user.

6. The method of claim 1 further including parsing a URL (Uniform Resource Locator) associated with the pinned web page to select a name of the displayed token.

7. The method of claim 1 further including launching a virtual personal assistant, the virtual personal assistant being adapted for interacting with the user by voice command and for triggering actions responsively to the voice command.

8. A mobile device having connectivity to a network including one of a wireless local area network or mobile operator network, comprising:
   one or more processors;
   a display that supports a user interface (UI) for conveying information to a user of the mobile device; and
   a memory device storing computer-readable instructions which, when executed by the one or more processors, cause the mobile device to:
      provide a start screen on the UI, the start screen including one or more tiles that represent user experiences accessible on the mobile device,
      display one or more tokens as tiles in the start screen, each token being associated with respective web pages and each token having a unique name,
      expose a virtual personal assistant being adapted for interacting with the user by voice command and for triggering navigation to a user-selected web page responsively to the voice command, wherein pinned web pages have associated displayed tokens on the start screen and unpinned web pages have voice command navigation capabilities disabled, the voice command using a syntax that includes the unique name of the token associated with the user-selected web page of the respective web pages that are pinned to the start screen,
      and
      launch a web browser on the mobile device and displaying the user-selected web page responsively to the voice command.

9. The mobile device of claim 8 further including configuring the virtual personal assistant to be launched from within any user experience currently being supported on the mobile device.

10. The mobile device of claim 8 further including providing controls for the user to pin and unpin web pages to the start screen.

11. The mobile device of claim 8 wherein the computer-readable instructions further cause the mobile device to navigate to the selected web page upon voice command without initiating an intermediate search on a remote service.

12. The mobile device of claim 8 wherein the computer-readable instructions further cause the mobile device to convert portions of text on the user-selected page to speech and playing the speech on an audio endpoint that is operatively coupled to the mobile device.

13. The mobile device of claim 8 wherein the computer-readable instructions further cause the mobile device to configure the virtual personal assistant to utilize data from internal sources instantiated on the mobile device, the data including at least geolocation data.

14. The mobile device of claim 8 further including communicating with an external service provider to receive data used by the virtual personal assistant.

15. The mobile device of claim 14 further including receiving a unique name for one or more of the displayed tokens from the external service provider, the external service provider parsing a URL (Uniform Resource Locator) associated with the selected web page to generate the unique name.

* * * * *